United States Patent
Hattori (10) Patent No.: US 7,248,180 B2
(45) Date of Patent: Jul. 24, 2007

(54) METER READING SYSTEM

(75) Inventor: Osamu Hattori, Chiba (JP)

(73) Assignee: Seiko Instruments Inc. (JP)

( * ) Notice: Subject to any disclaimer, the term of this patent is extended or adjusted under 35 U.S.C. 154(b) by 734 days.

(21) Appl. No.: 10/653,640

(22) Filed: Sep. 2, 2003

(65) Prior Publication Data
US 2004/0078350 A1   Apr. 22, 2004

(30) Foreign Application Priority Data
Sep. 3, 2002   (JP)   ............................. 2002-257796

(51) Int. Cl.
  *G08B 23/00*   (2006.01)
  *G08C 15/06*   (2006.01)
(52) U.S. Cl. ........................... 340/870.02; 340/870.07; 396/280
(58) Field of Classification Search ........... 340/870.02, 340/870.07; 346/14; 396/280
See application file for complete search history.

(56) References Cited

U.S. PATENT DOCUMENTS 5,016,025 A * 5/1991 Wyss ..................... 346/14 MR
5,485,509 A * 1/1996 Oliver ................... 379/106.06

* cited by examiner

*Primary Examiner*—Timothy Edwards, Jr.
(74) *Attorney, Agent, or Firm*—Adams & Wilks (57) ABSTRACT

A reduced power-consumption meter reading system has a clock for counting elapsed time and days and outputting a first output signal for a predetermined time during a month, a first power supply activated by the first signal of the clock, and an image-processing unit driven by the first power supply for acquiring an image of a display portion of the meter. The image processing unit is driven only during the duration of the first output signal. In one embodiment, the clock outputs a second output signal for a second predetermined time during a month, and a second power supply is activated by the second output signal of the clock and drives a radio communication unit to transmit the image acquired by the image-processing unit to another radio communication unit.

17 Claims, 14 Drawing Sheets

METER READING SYSTEM

BACKGROUND OF THE INVENTION

1. Field of the Invention

This invention belongs the technical field of reading the value displayed on a meter and transferring these values.

2. Description of the Prior Art

Figure 14A:
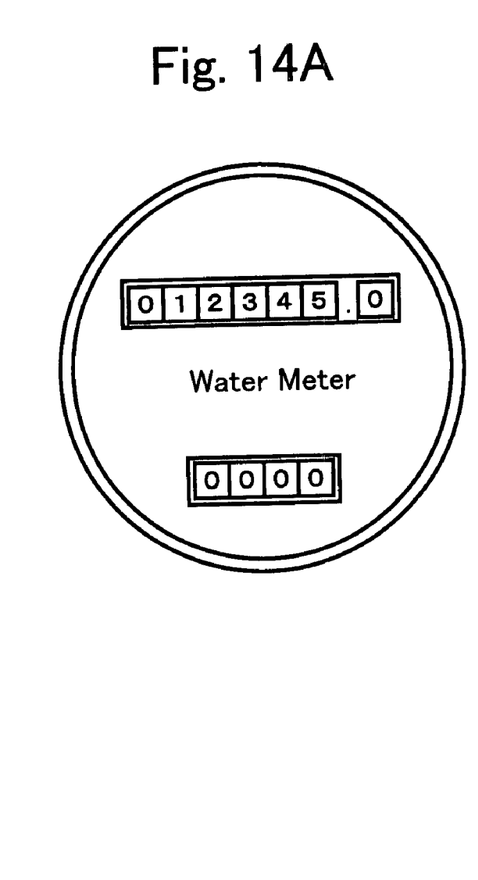
FIG. 14A shows a numerical display type.
Figure 14B:
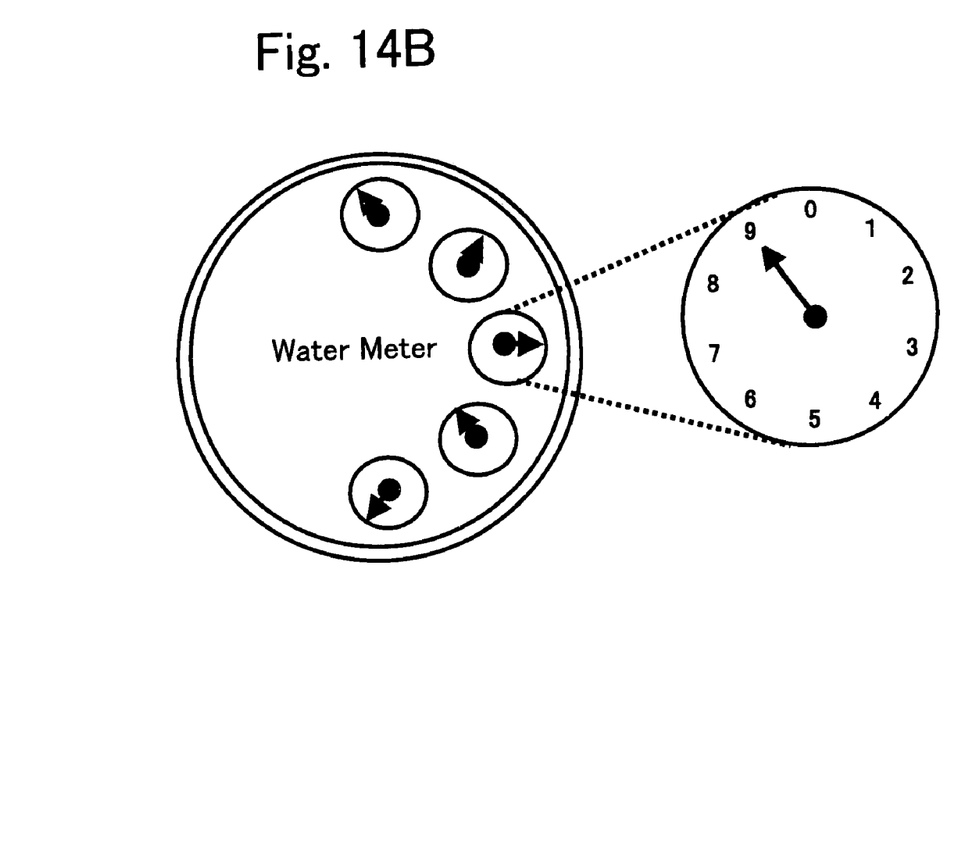
FIG. 14B shows a positional display type.

A utility meter, in general, which indicates the flow rate or the accumulated amount of usage, measures and displays mechanically the values, for example, of the flow of gas in the case of a gas meter and the flow of water in the case of a water meter, by moving the detectors by kinetic energy of the flow. These meters can function without electrical power. These meters are located, in general, at the point of use of the utility. One has to go to the location of the utility meter to read the value displayed on the meter, and to write down the value when to next read the meter. FIGS. 14A-14B show the display portions of the water meter. FIG. 14A indicates a water meter having a digital display operated by needle position. A utility meter of both display methods combined can be found in the market.

As the current apparatus of reading the panel surface of utility meter a cover is placed over the panel and a ring light lights up the panel. A CCD camera integrated in the apparatus takes a picture of the surface of the panel. The image taken is sent to a laptop computer as a meter image signal. The image data taken by the laptop computer is compared with many pre-acquired standard image data registered under the meter pattern database of the meter pattern setting. The number or position of utility meter indicating the amount of usage is extracted from the meter image. (For example, refer the appendix of the patent article 1)

Again, the current apparatus of meter reading equipment, at an automated meter reading system in which the measured value of the meter is remotely controlled by radio, has a parent radio station that resends a retry command signal toward the child radio station of the utility meter indicating an error in data transfer with its ID number when the parent radio station received the data from the child station with some error or the parent station could not get the data from the child station at all. The parent radio station recognizes that the received data has some error in it and sends automatically the retry command signal with the ID number of the specific child station to the specific child station. (For example, refer the appendix of the patent article 2)

Patent Article 1

JP-A-2000-182021 (the 3rd page, FIG. 1)

Patent Article 2

JP-A-8-249584 (the pages 2 and 3, FIG. 1)

The meter reading in general, however, may need, electrical power. It is common for the placement of a gas meter or a water meter in a location that does not have a power line nearby. The power can be obtained from a battery but it is not very efficient if the replacement of the battery must be performed very often. It is practically impossible to get into and to read a meter placed on someone's property without his permission while he is out of the property. Also, a watchdog may be found on the property even if he is not out of his property.

On the other hand, the size of the battery is limited while the size of the reading apparatus is getting smaller in size. Moreover, radio transmission consumes a great deal of power.

SUMMARY OF THE INVENTION

This invention tries to solve the problem by minimizing power consumption during a waiting time, which is the interval between meter readings.

The meter reading system of this invention comprises a clock with a calendar function, a first power supply activated by the output of the clock and image-processing units powered by the first power supply for inputting the image of a display panel of the utility meter, wherein the clock with calendar function outputs the signal to activate the first power supply at a certain period of time within a month.

The meter reading system of this invention further comprises a second power supply activated by the clock with calendar function and a radio communication unit powered by the second power supply that transfers the information acquired from the image-processing system to other radio station, wherein the clock with calendar function outputs the signal to activate the first power supply in the certain period of time within a month.

The meter reading system of this invention also preferably performs a function in which the activation period of time issued by the clock with calendar function can be modified by the radio signal emitted from the radio system mentioned above.

The meter reading system of this invention equips a movable joint that permits to mount the image-processing unit upon the display portion of the meter system and a fixing apparatus in order for the movable joint to prevent rotating.

The meter reading system of this invention is equipped with the radio communication unit and transfers the user specific identifier information and the data from the image-processing unit another radio communication unit.

BRIEF DESCRIPTION OF THE SEVERAL VIEWS OF THE DRAWINGS

A preferred form of the present invention is illustrated in the accompanying drawings in which:

FIGS. 5A-5C are structure a drawing and composition drawings of the image detector, in which

FIGS. 14A and 14B are drawings of a display panel of the water meter, in which

DETAILED DESCRIPTION OF THE PREFERRED EMBODIMENTS

The actual content of each embodiment of this invention is explained hereinafter by using Figures.

Embodiment 1

The method of reading the value indicated by the meter automatically and the method to correct the apparatus is stated as follows:

The action of reading a meter for the purpose of collecting a fee takes place periodically within a certain interval. For example, the meter reading of a utility such as gas, water and electricity takes place once a month in general. The meter itself is basically an accumulator of utility flow and the amount of used utility is calculated by the difference between the reading of this month from the reading of last month. For this reason, to employ the passive way of reading, the reading can be done by recognizing electrically the value shown on the meter periodically and by sending the read out value through radio. In other words, reading of the meter takes place only upon demand. It is possible to cut unnecessary power and to stop the function of the portion of system not in use.

Figure 1:
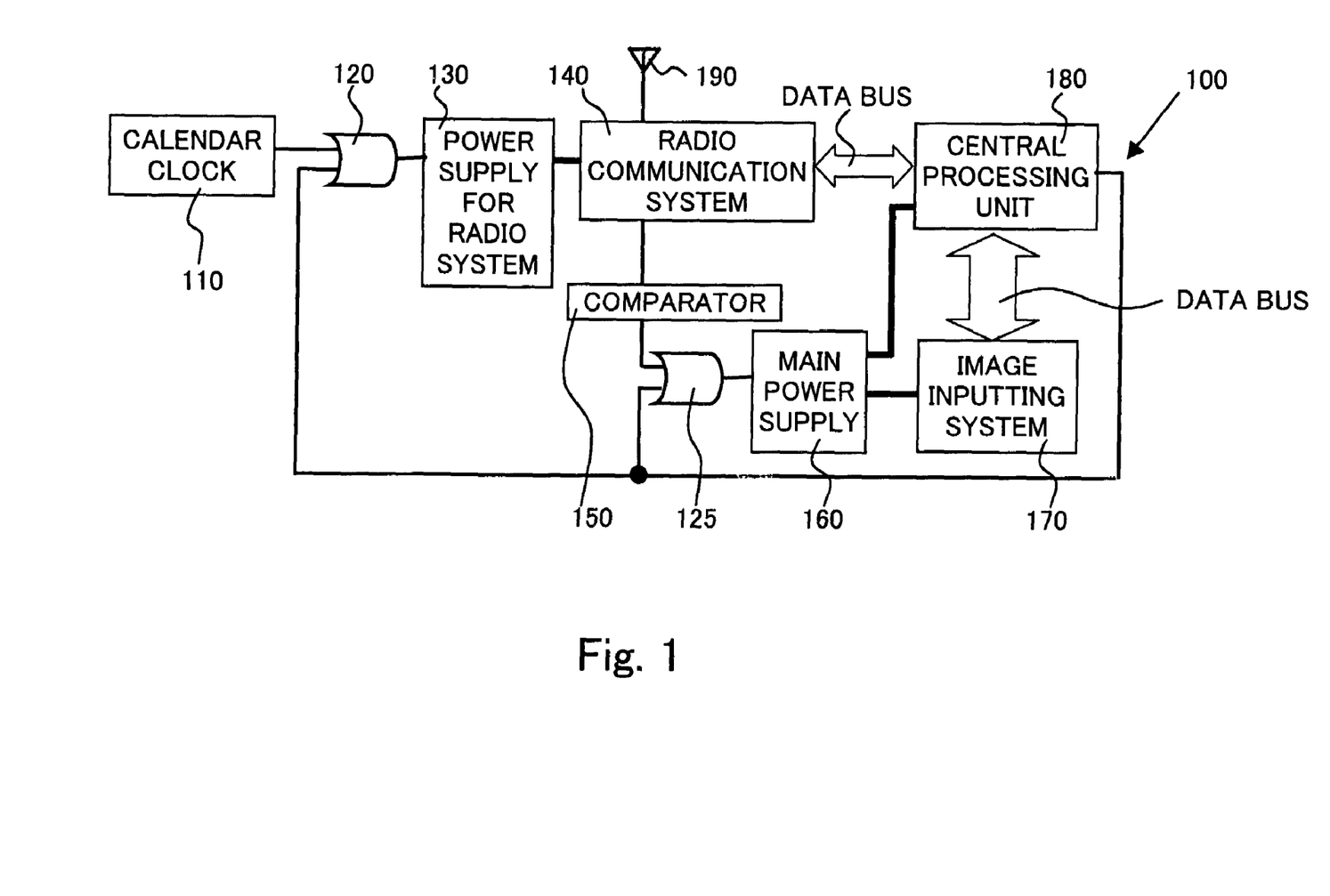
FIG. 1 is an overall structure of the passive meter reading system.

FIG. 1 shows the structure of the passive meter reading system. The passive meter reading system 100 explained in this embodiment equips a calendar clock 110 for counting elapsed time and days, a power supply for the radio equipment 130, a radio communication system or unit 140, a comparator 150; a central processing unit 180, a image-processing unit (or image inputting system) 170, a main power supply 160 and two OR logical circuits 120 and 125. The calendar clock has two different functions. The calendar clock 110 and the OR logical circuits 120 and 125 are connected a power supply that always in functions. The calendar clock 110 is programmed with the appropriate period of the meter reading and the calendar clock 110 submits the signal to activate the power supply for the radio system 130. The radio communication system 140 is powered up and the radio communication system 140 is then turned on to function. The power supply for the radio system 140 and the comparator 150. When both are turned on, the radio communication system 140 listens to the predefined frequency, and receives the modulated information of the frequency through the antenna 190, and recovers the content of the information, and then sends the content to the comparator 150.

The radio communication ii*it system has a function to receive a remote the command coming from a distance and to transfer the result of meter reading by modulating the result at radio frequency. For example, a transceiver, which is a transmitter and a receiver combined, of low power radio may minimize the transmitter power. The comparator 150 has a function to detect arrival of 'the command of meter reading' and to turn the main power supply 160 on. The image-processing unit 170 has the function to take in the value displayed in analog or digital format on the meter display panel. The central processing unit 180 has as a main function to analyze the image taken in and to control the radio communication traffic.

Figure 2:
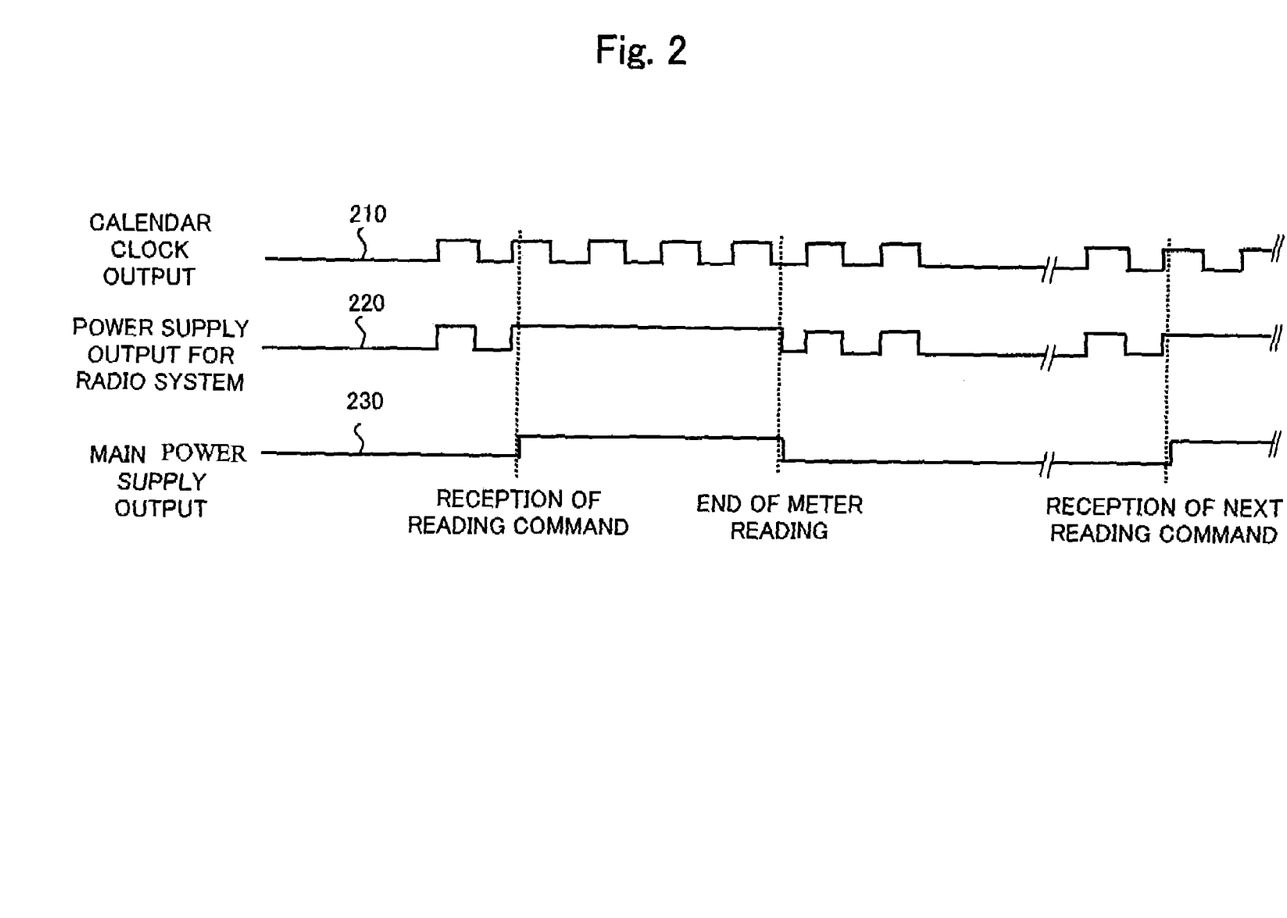
FIG. 2 is a timing chart of the calendar clock and power supply output.

FIG. 2 shows the timing chart of the calendar clock 110, the output status of the power supplies 130 and 160. It is obvious from the chart that the calendar clock 110 submits the signal 210 while a predefined meter reading period is approaching. Synchronizing to this signal 210, the power output 220 of the power supply for the radio equipment 130 is turned on. Once receiving the 'Command of Meter Reading', the power output 230 of the main power supply 160 remains on until all the meter reading process is done. For the period of time above, the power supply for the radio equipment 130 remains on also. It is possible to turn the signal out of the calendar clock 110 down after reception of data is completed but taking into consideration of retry of meter reading, the signal out of the calendar clock is kept high for a certain period of time before turning it down in the case of this embodiment. Then, the signal out of the calendar clock 110 is turned down until an a next meter reading period approaches. The date of the next meter reading period can be modified by sending the new date to the passive meter reading system 100 and by making the calendar clock to memorize the new date. Turning down the signal out of the calendar clock 110 completely cuts the power off for the unnecessary circuit and is not just putting them into the sleeping state.

It is a common power saving technique to put circuits not in use into a sleeping state while the interval between two sampling periods is longer than the effective sampling time. The circuit at the sleeping state sometimes still may consume several microamperes of current. Accumulating even microamperes of power consumption may become a factor to shorten the battery life. For the case that the interval between two samplings is nearly a month and the effective sampling time is several seconds, as stated in this embodiment of the invention the power supply itself for the circuit is cut off except for some specific circuits. This method permits the device to conserve more power.

Figure 3:
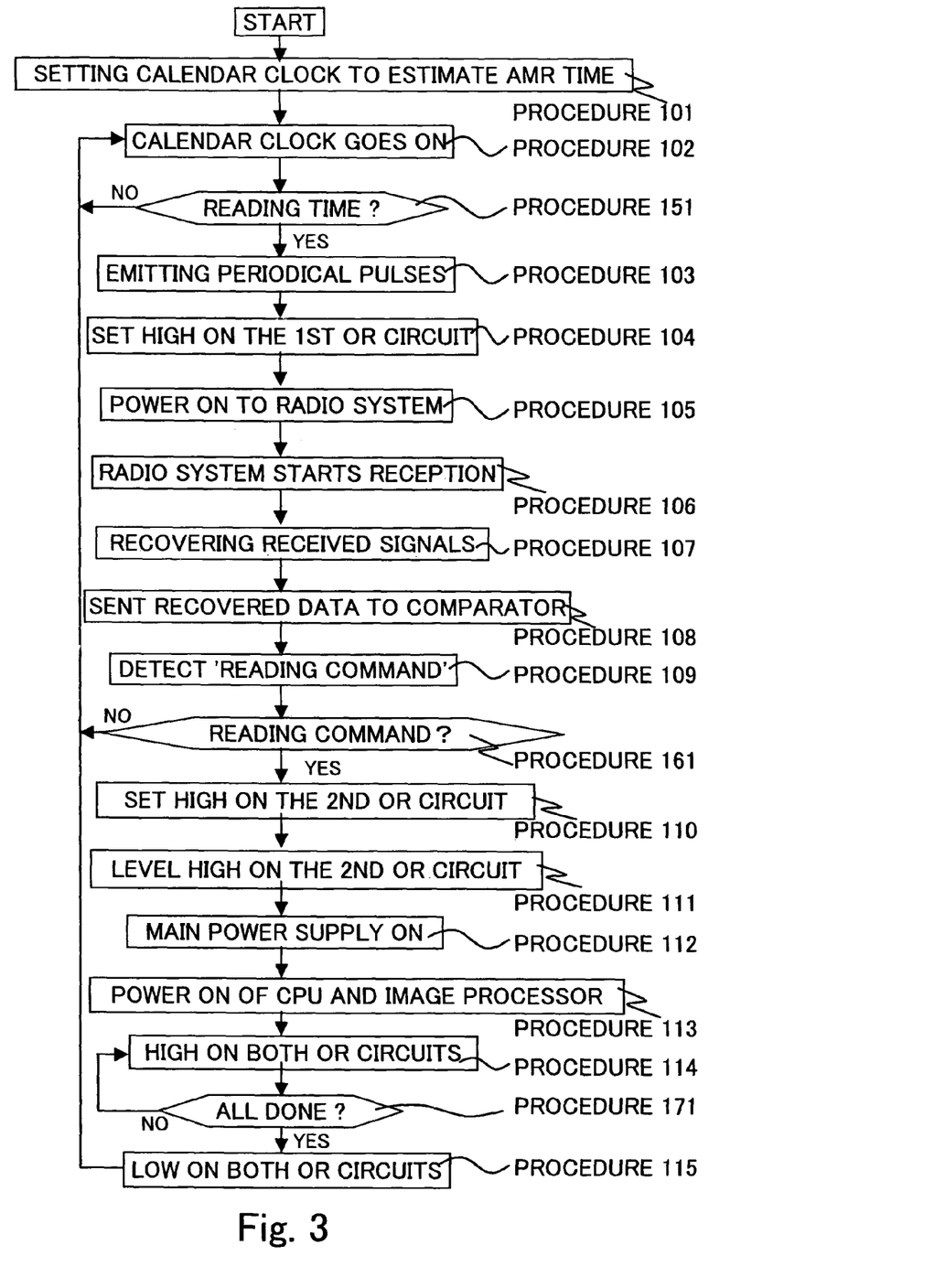
FIG. 3 is a flowchart indicating On and Off of power supply.

The procedure to turn on and off of the power supply is indicated on FIG. 3. setting the calendar clock 110 to the ambient meter reading (AMR) period is performed (Procedure 101). The calendar clock 110 counts time (Procedure 102). The calendar clock 110 starts to submit the periodical signal of activation (Procedure 151) when the ambient meter reading period, the period of time estimated that the meter reading is to be executed, is approaching (Procedure 151). On the other hand, when the period of meter reading is determined to be far away (Procedure 151), the calendar clock 110 keeps counting time (Procedure 102). The logical state of the signal out of the first OR circuit 120 is set HIGH (1) activated by the signal output from the calendar clock 110 (Procedure 104). The logical state of the first OR circuit output is set HIGH (1) and then the power supply for the radio equipment 130 is enabled (Procedure 105). The radio communication unit powered by the power supply 130 starts receiving radio signals (Procedure 106). The radio communication unit 140 demodulates the received signals (Procedure 107), sends the recovered information to the comparator 150 (Procedure 108), and makes a comparison if the information sent was the 'Command of Meter Reading' signal (Procedure 109). If the received signal is the 'Command of Meter Reading' signal, the comparator 150 sends HIGH (1) to the input of the second OR circuit 125 (Procedure 110). Then, the output of the second OR circuit is turned HIGH (1) (Procedure 111), and the main power supply is turned on (Procedure 112). Then, the central processing unit 180 and the image processing unit 170 gain power and start to be enabled (Procedure 113). The central processing unit 180 activates during the action of meter reading, the input of both OR circuits 120 and 125 for the reason to turn on the power supply (Procedure 114). The main power supply 160 is turned off after the central processing unit 180 has finished all the action related the meter reading by setting the input of both OR circuits at LOW (0) state (Procedure 115). Then, the passive meter reading system 100 becomes ready for next meter reading action.

Figure 4:
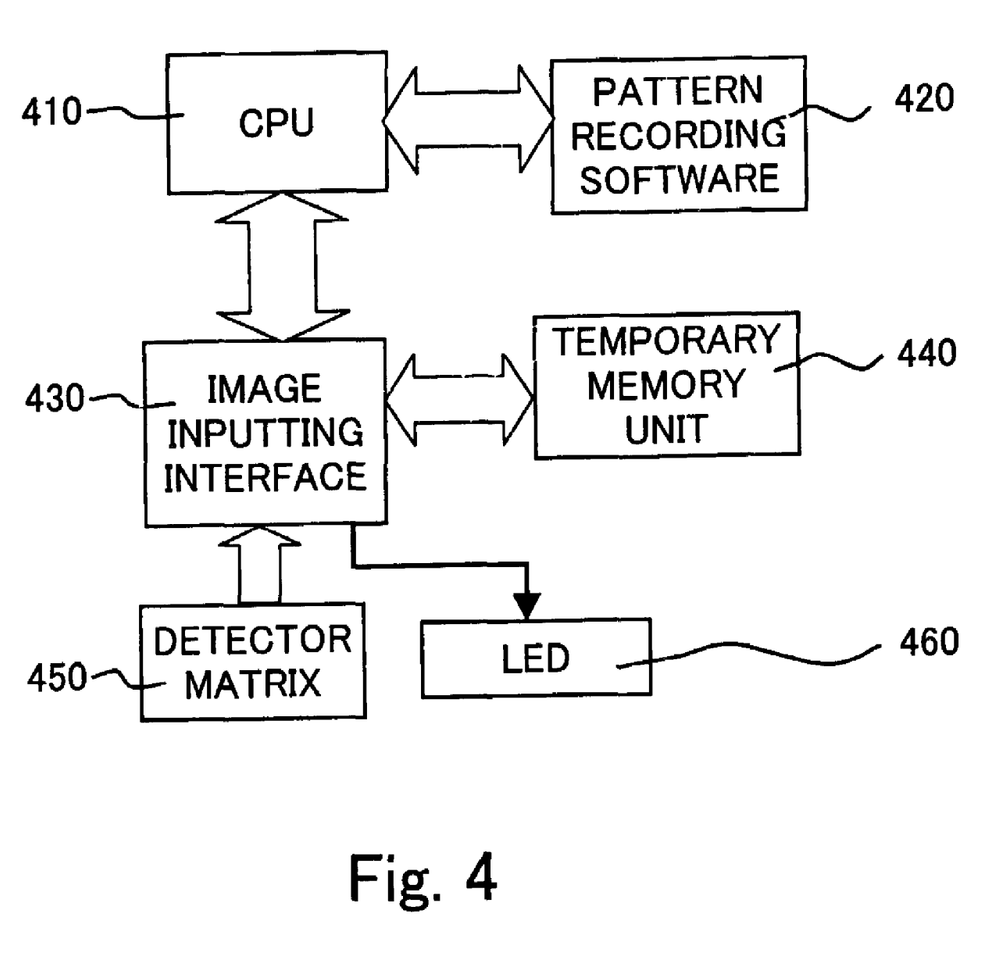
FIG. 4 is a structure drawing of the image-processing unit.

The procedure to read the value digitalized mechanically or optically is explained hereinafter. FIG. 4 shows the structure of the image-processing system that is comprised of the image acquisition unit and the pattern recognition unit. The image-processing unit 170 is divided into the image acquisition unit that acquires the image of the value shown on the utility meter and the pattern-recognition unit that extracts the meter value in number by pattern matching techniques. The image acquisition unit is comprised the light emitting diode (LED) 460, the detector matrix 450 and the image processing interface (or image inputting interface) 430. The LED has a function to light up the surface of meter panel while acquisition of image takes place. The detector matrix 450 is comprised of, for example, a charge coupled device (CCD) or a complementary metal oxide semiconductor (CMOS) array and has a function to take an image in. The image-processing interface 430 has a function to temporarily save the image taken and to transfer the image information to the pattern recognition unit. The pattern recognition unit consists of the central processing unit 410 and the pattern recognition software 420. The central processing unit 410 obtains the image information from the image-processing interface 430, then extracts the value shown on the utility meter in number from the image taken-in, and then transmits the extracted value to the receiver of the passive meter reading system through the radio communication unit 140.

Figure 5A:
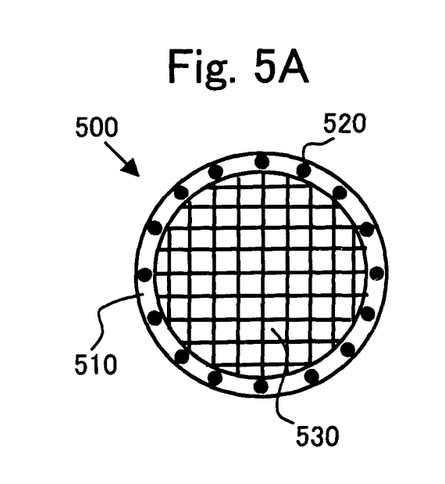
FIG. 5A is a front view.
Figure 5B:
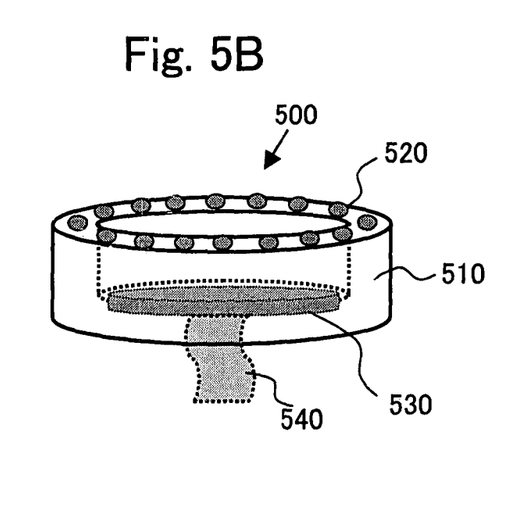
FIG. 5B is a side view.
Figure 5C:
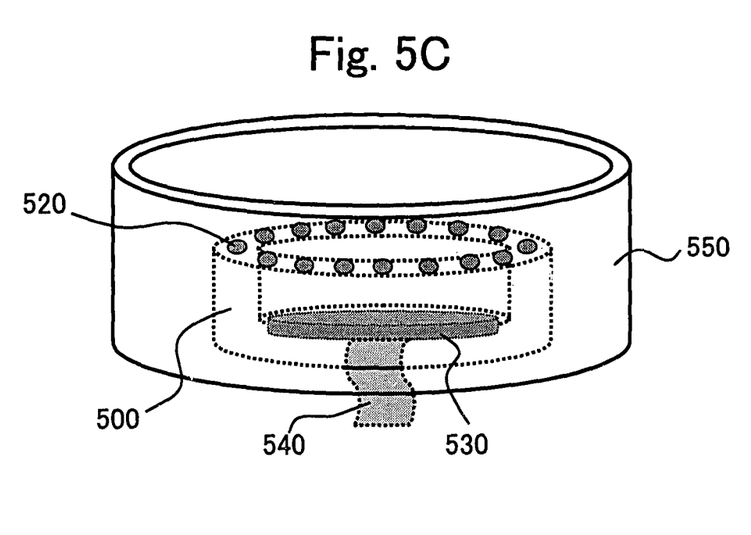
FIG. 5C is an architecture.

The explanation of the image detection unit 500 that takes the image of the display panel of the utility meter is hereinafter. FIG. 5 are the schematics showing the structure of the image detection unit 500. The image detection unit 500 is comprised the light emitting diode (LED) 520 for lighting and the detector matrix 530. The display panel of the utility meter typically has a round shape so that the image detection unit 500 also has a round shape. The LED 520 is placed around the surface of the image detection device 510. The color of the LED 520 should be the color of preference to best acquire the image. The actual colors of the LED 520, for example, are white, blue, green, yellow and so forth. The detector matrix 530 is located at a lower level from the location of the LED 520. This structure eliminates unwanted light introduction to the detector matrix 530 such as direct light from the LED 520 or indirect light by reflection. The detector matrix 530 is connected to the detector cable 540. The image detection unit 500 is covered by the detector enclosure 550. The detector enclosure 550 has a round shape as the image detection unit 500.

Figure 6:
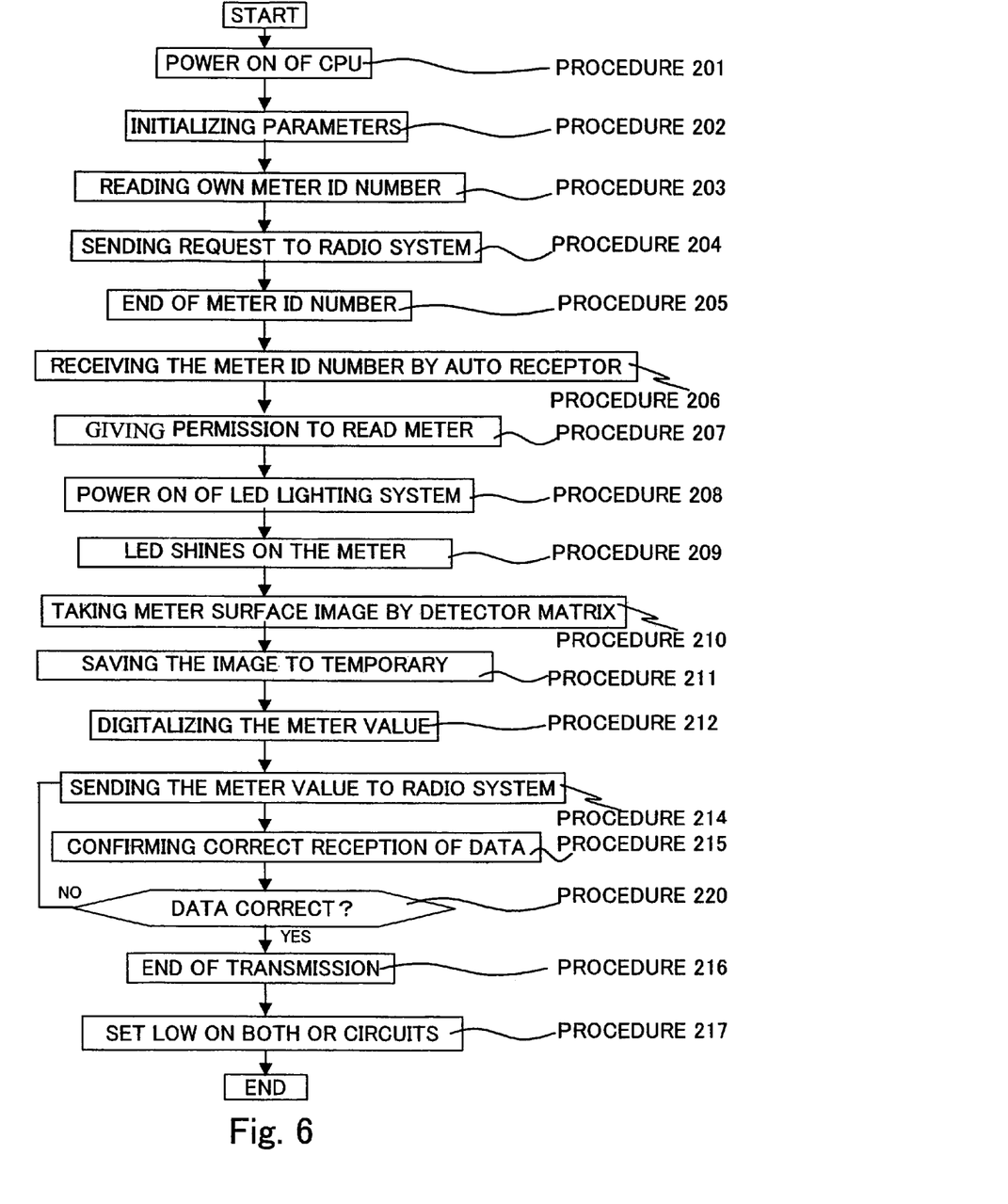
FIG. 6 is a flow chart of taking in the image and pattern recognition.

The function of the image-processing unit and the pattern recognition unit is as follows: FIG. 6 is the flow chart indicating the flow of the image-processing unit and the pattern recognition unit. The central processing unit 410 gains power (Procedure 201). The central processing unit 410 initializes the parameter and the conditions (Procedure 202). The central processing unit 410 takes its own ID number of the passive meter reading system (Procedure 203). The central processing unit 410 commands the radio communication unit 140 to transmit this value (Procedure 204). The radio communication unit transmits the ID number of the passive meter reading system (Procedure 205). The receiver of the passive meter reading receives the ID number of the passive meter reading system (Procedure 206). The receiver of the passive meter reading system gives a permission to send the passive meter reading system 100 to perform meter reading (Procedure 207). When the central processing unit 410 receives the permission, the central processing unit 410 sends a command to set power on the LED 520 to the image acquisition interface 430 (Procedure 208). The LED 520 lights up and shines on the display panel of the utility meter (Procedure 209). The detector matrix 530 takes the image in (Procedure 210) and the image is temporarily saved in the temporary memory unit 440 of the image acquisition interface 430 (Procedure 211). The central processing unit 410 extracts the numerical value of the display by digitizing the image data stored temporarily by use of pattern recognition software 420 (Procedure 212). As the method of pattern recognition each pixel is binalized, classifying either 1 or 0 in other words, based upon the light intensity information of the entire pixels for the case of that the display is in numerical number. The lines are extracted form the binalized image and the number is determined by pattern matching of these lines and the lines pre-stored in the central processing unit 410. This is a common way to determine the numerical value. For the case that the value is defined by the position of the needle the direction that the needle points out is extracted and the numerical value is calculated from the position. These are two examples of extraction of the numerical values. The central processing unit 410 sends the numerical value extracted by pattern recognition to the radio communication unit 140 (Procedure 213). The radio communication unit 140 modulates the value into RF frequency and transmits it (Procedure 214). The radio into RF frequency and transmits it (Procedure 214). The radio communication unit confirms if the reception was completed with correct values (Procedure 215). In the case of reception of correct values (Procedure 220) radio transmission is terminated (Procedure 216). On the other hand, in the case of reception of incorrect values (Procedure 220), the procedures 214, 215 and 220 are repeated until reception with correct values. When the radio transmission is over (Procedure 216), the central processing unit 410 send LOW (0) to the both OR circuits 120 and 125 (Procedure 217). This action deactivates the power supply for the radio equipment 130 and the main power supply 160 into power down state (Procedure 218). When these two power supplies are turned off, then only the calendar clock counts time and days and it continues until the next meter reading moment.

Embodiment 2

Figure 7:
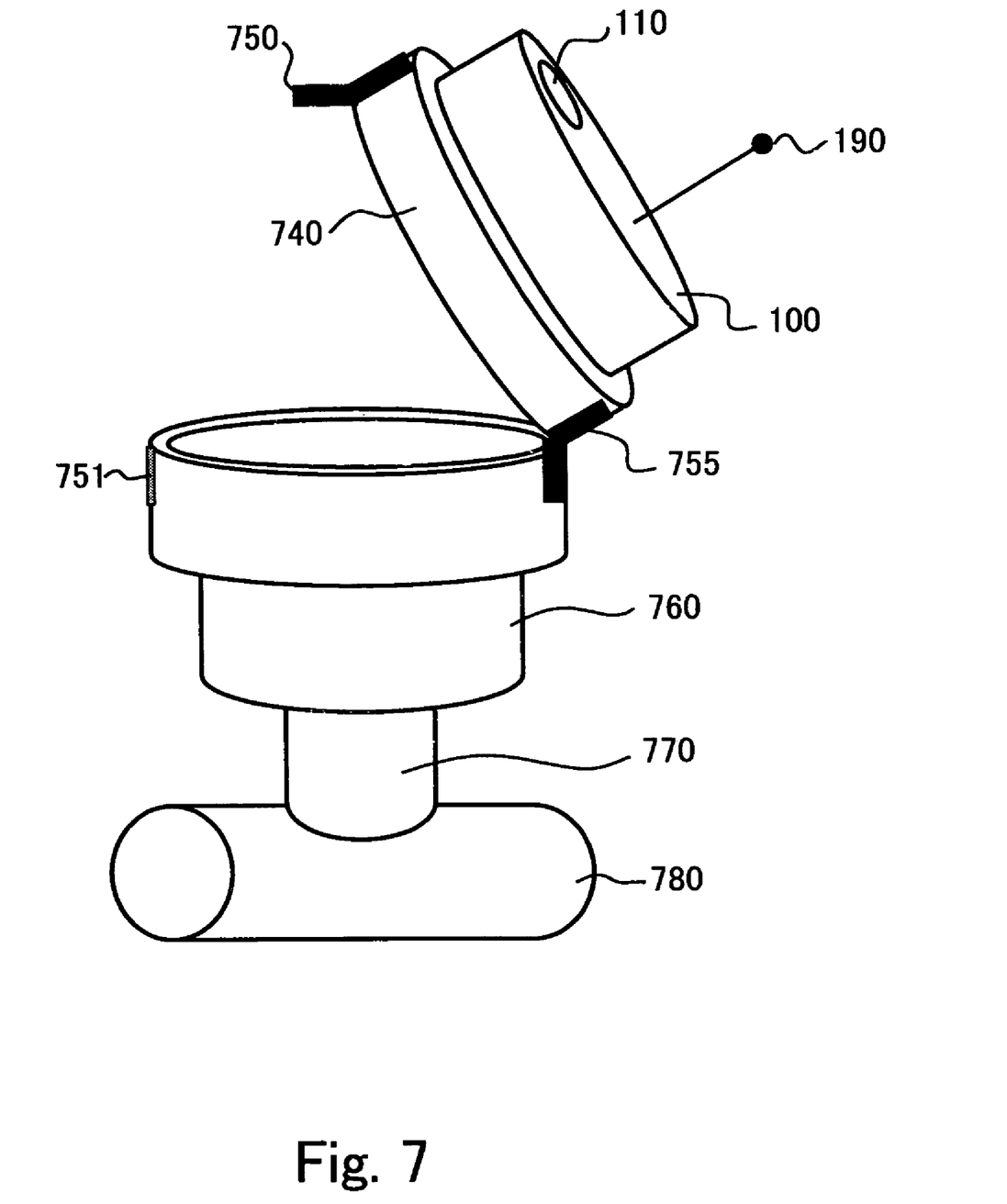
FIG. 7 is a structure drawing of the passive meter reading system for water.

This embodiment is comprised of the explanation of the automated meter reading system for water. FIG. 7 shows the structure of the automated meter reading system for water. The passive meter reading system 100 has the physical shape of a lid of the utility meter 760. The passive meter reading system 100 equips a movable joint that permits the rotation form one side and also equips two metal fittings 750 and 751 on the other side of the movable joint in order for the passive meter reading system 100 to fix to and/or to remove from the utility meter 760. This system permits for a meter reader to look directly at the surface of the display panel of the utility meter 760. Fixing the passive meter reading system 100 over the utility meter 760 by the movable joint 755 and fixing metal fittings 750 and 751 without a space eliminates light entry from out side and thus makes it easy to perform pattern recognition. The passive meter reading 100 has two parts, the image acquisition unit and the main body of the passive meter reading system. The image detection device and the image acquisition interface are integrated in the image acquisition unit as FIG. 4 shows. The calendar clock 110, the power supply for the radio equipment 130, the main power supply 160, the radio communication unit 140, the central processing unit 180 and the antenna 190 are integrated in the main body of the passive meter reading system. The utility meter is connected to the waterway 780 by the piping 770.

Figure 8:
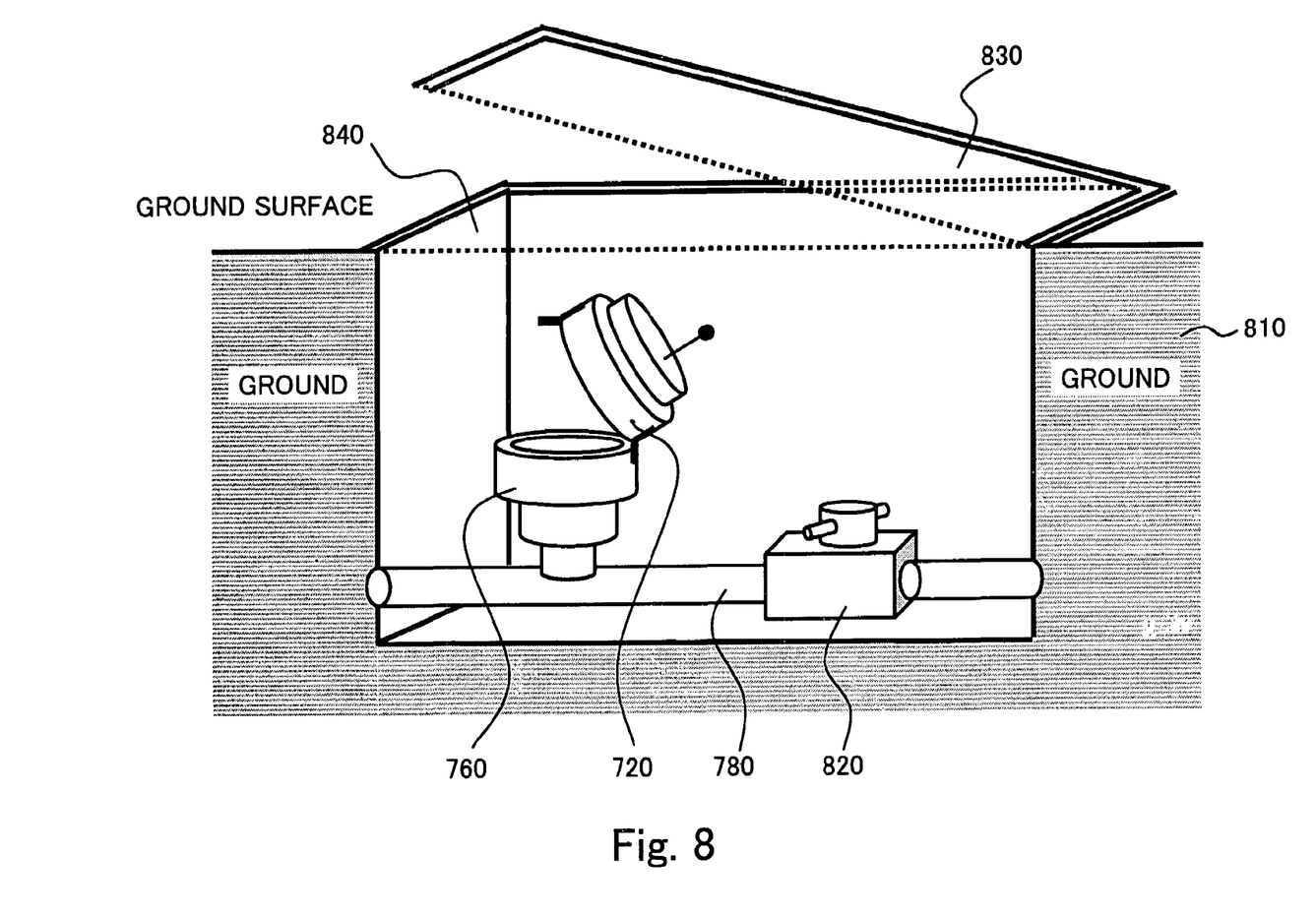
FIG. 8 is a placement drawing of the passive meter reading system for water.

The environment where the passive meter reading system is placed is as follows: FIG. 8 shows the environment of placement for the passive meter reading system 100. The utility meter 760 is placed in, in general, a metal box 840 with specifically a cast iron lid 830. The metal box is, in general, placed under the ground. Meter reading takes place to read the utility meter 760 by opening up the cast iron lid 830. FIG. 8 shows the case of an opening and shutting valve 820 installation in the cast iron box.

Figure 9:
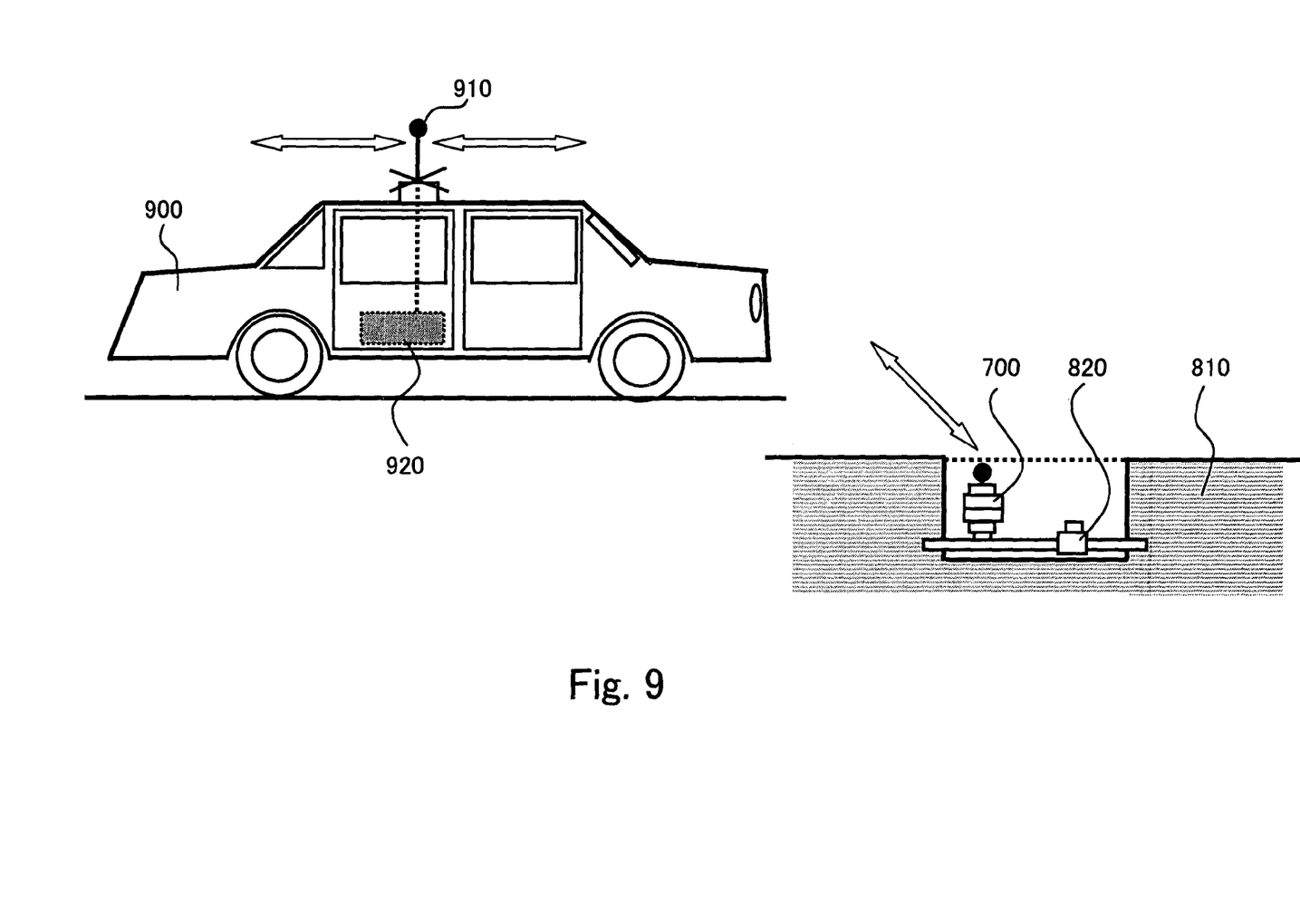
FIG. 9 is a diagram of passive meter reading by using an automobile.
Figure 10:
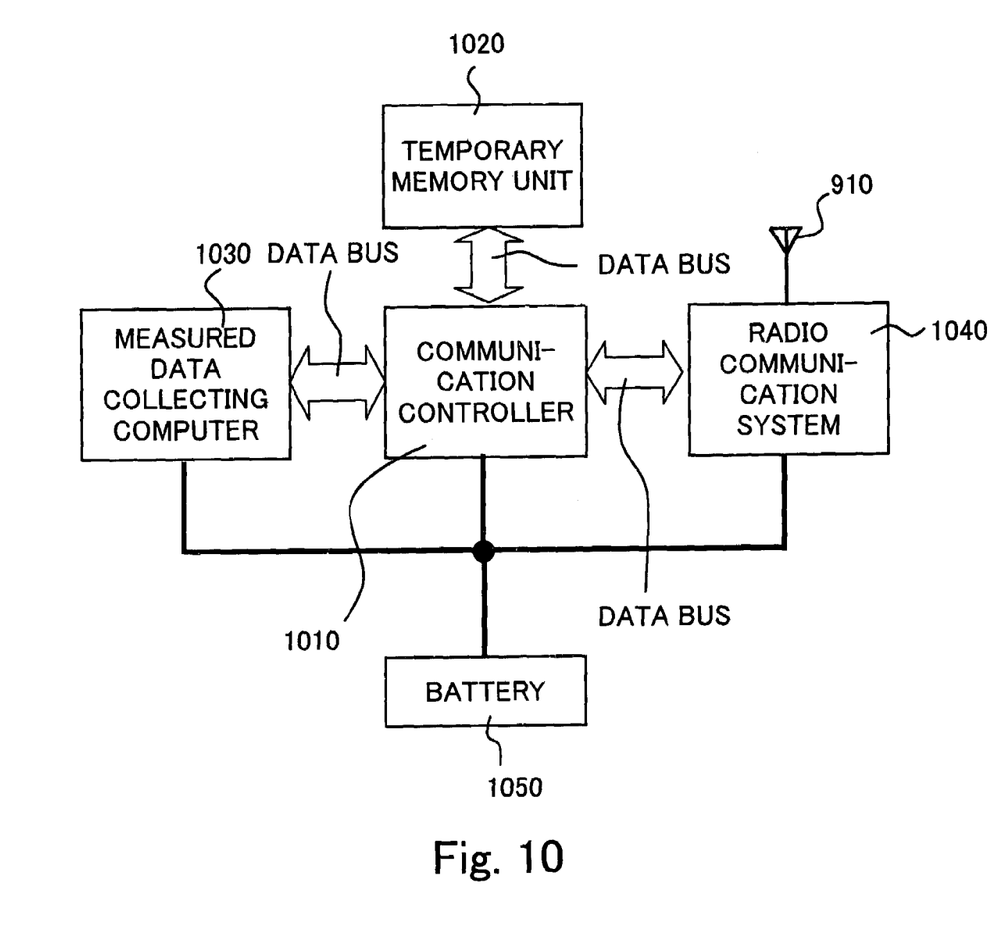
FIG. 10 is a structure drawing of the receiver of the passive meter reading system for an automobile.

The next is the explanation of the receiver of the passive meter reading system that the passive meter reading system transmits the result of meter reading. For the actual installation setting there are two major ways. As the first case, the receiver of the passive meter reading system 920 is installed in a moving object such as an automobile 900 and, as the second case, meter reading is done by a hand held type remote receiver unit if the passive meter reading system where the receiver of the passive meter reading system is integrated in. FIG. 9 show the case of meter reading by using an automobile 900. FIG. 10 shows the configuration of the receiver of the passive meter reading system for an automobile 920. The receiver of the passive meter reading system for an automobile 920 is comprised the radio communication unit 1040, the radio communication control unit 1010, the memory unit for temporary data saving 1020, the computer unit of meter data acquisition 1030 and the battery 1050. While the receiver of the passive meter reading system is in action, the data communication unit sends contentiously with a certain interval the 'Command of Meter Reading' toward the passive meter reading system. When the passive meter reading system 100 receives the radio transmission containing 'the Command of Meter Reading', the computer unit of meter data acquisition collects the meter reading values following the flowchart indicated in FIG. 6.

Figure 11:
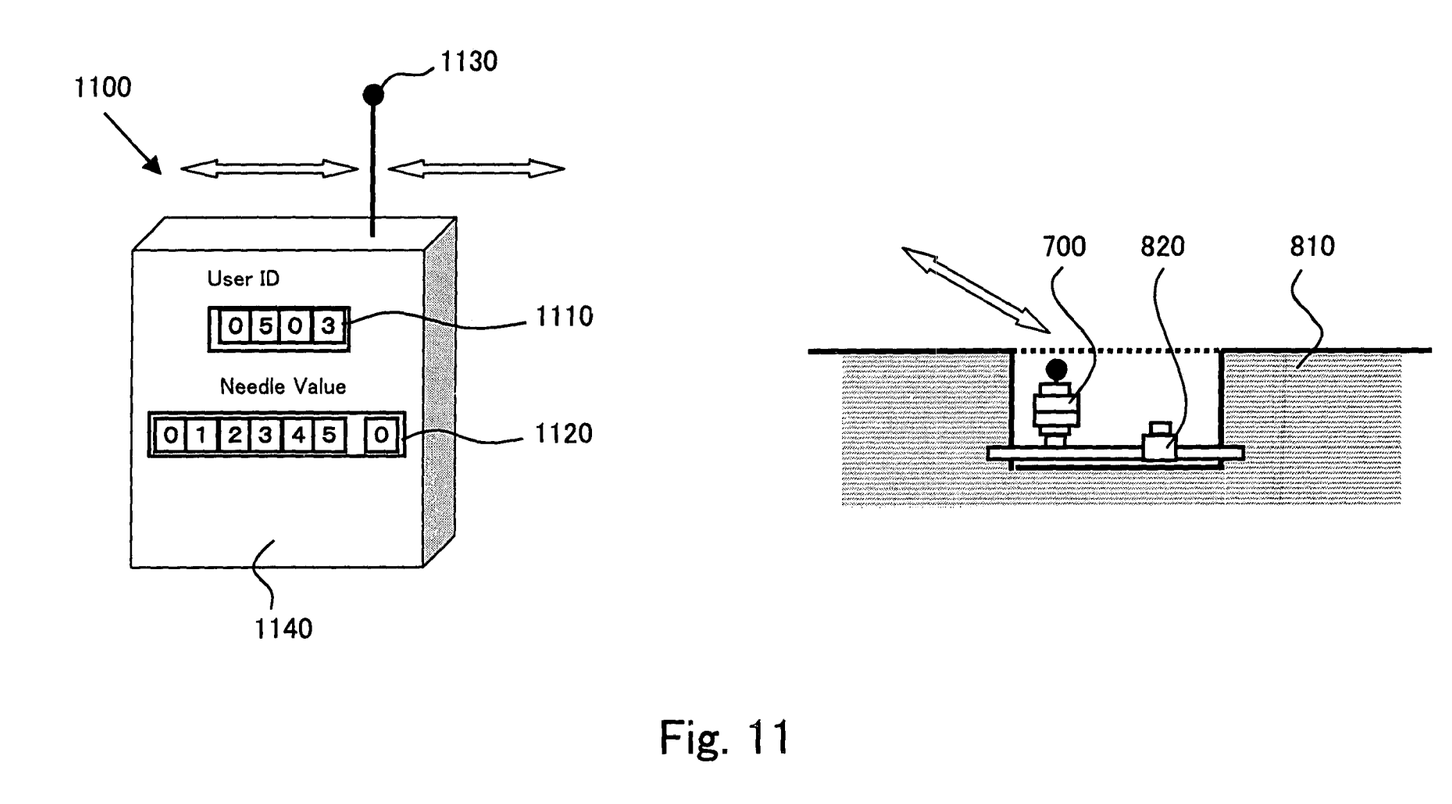
FIG. 11 is a drawing in case to read a meter using the hand held type remote receiver unit.
Figure 12:
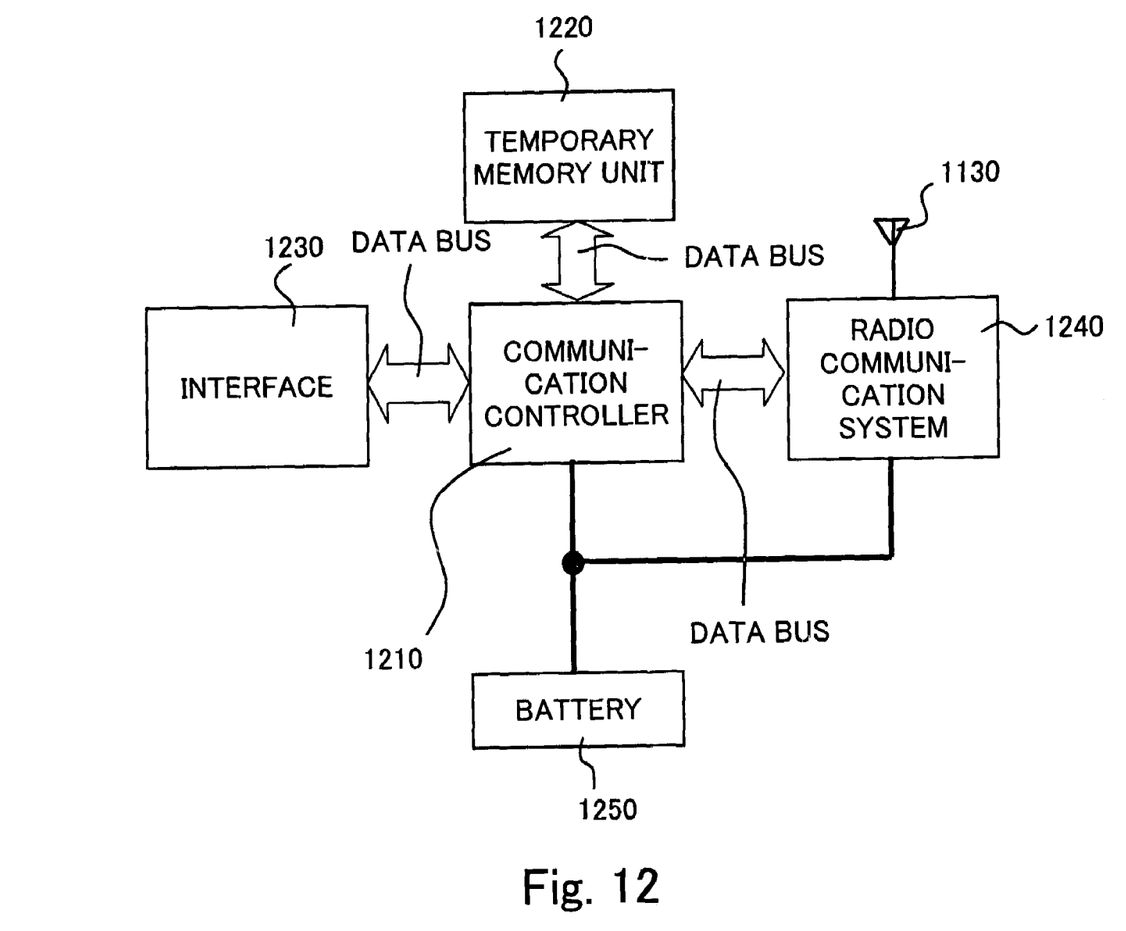
FIG. 12 is a structure drawing of the hand held type remote receiver unit.

Here explains the hand held type remote unit where a person executes meter reading carries around. FIG. 11 indicates the hand held type remote receiver unit of the passive meter reading system in action. The hand held type remote receiver unit of the passive meter reading 1100 is shown in FIG. 12. The handheld type remote receiver unit of the passive meter reading 1100 is consisted of the radio communication unit 1240, the radio communication controller 1210, the memory unit for temporary data saving 1220, the interface 1230 and the battery 1250. The structural difference of the hand held type remote receiver unit from the receiver installed in an automobile is absence of the computer unit for meter data acquisition. The hand held type remote receiver unit 1100 saves meter data into the memory unit for temporary data saving and then these data will be transferred through the terminal 1130.

The hand held type remote receiver unit of the passive meter reading system 1100 equips the portion to, display the user ID number in digits 1110 and the portion to display the current meter reading value coming from the utility meter 1120 in a chassis 1140.

Figure 13:
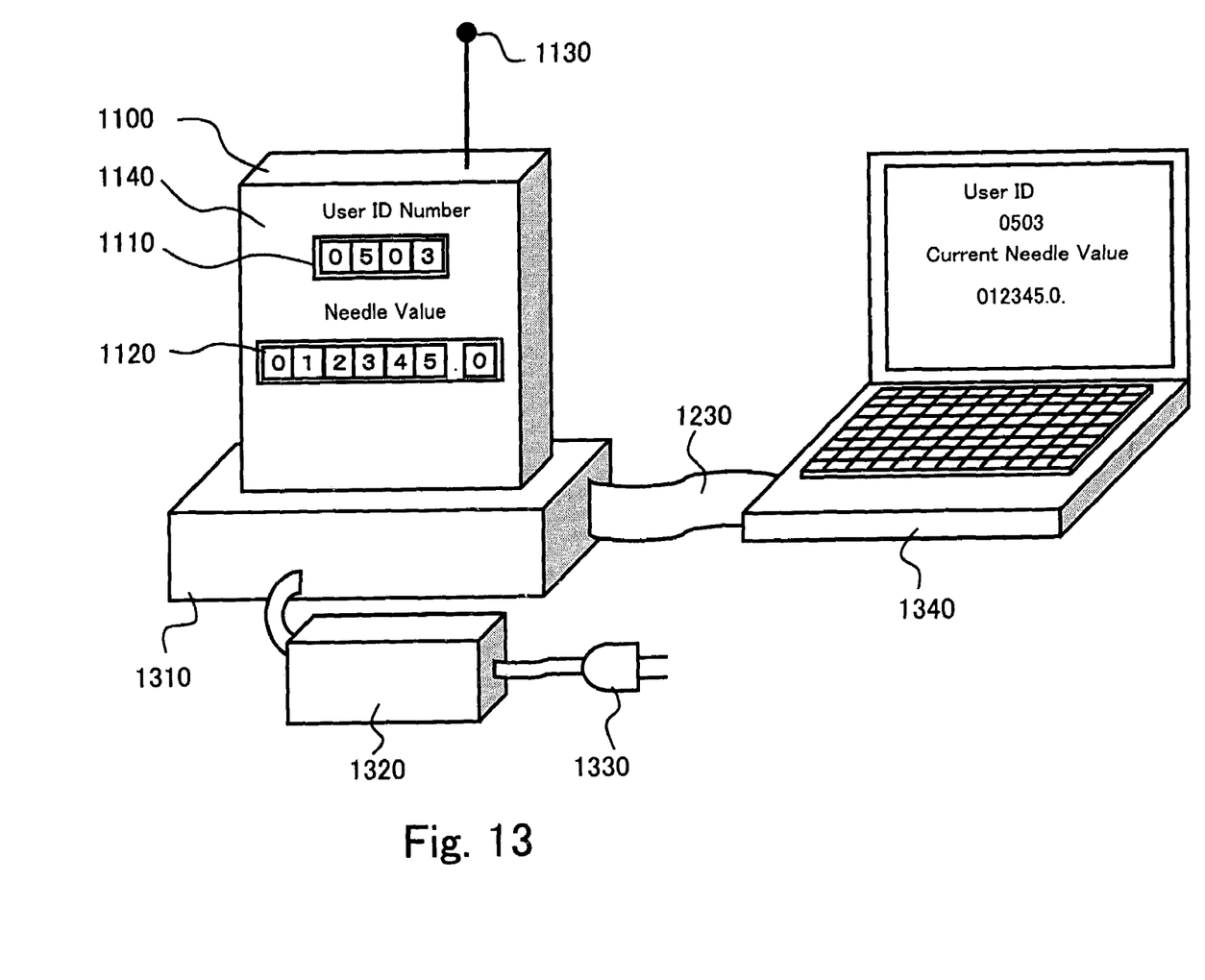
FIG. 13 is a drawing of data transfer and Recharging of the hand held type receiver unit.

Now explains the data transfer method of the hand held type remote receiver unit of the passive meter reading system. FIG. 13 shows the schematic connecting the hand held remote receiver unit of the passive meter reading system 1100 to the data terminal 1310 and transferring the data to the computer. The hand held type remote receiver unit of the passive meter reading system 1100 has to discharge the data before the memory unit 1220 in the hand held unit 1100 is completely full. The hand held type remote receiver unit of the passive meter reading system 1100 is expected to be carried around by a human being so that the quantity of the battery 1250 to be carried around is limited. The battery 1250, therefore, must be recharged time to time.

FIG. 13 shows the status of data transfer from the hand held type remote receiver unit of the passive meter reading system 1310 through the data terminal 1310. Recharging of the battery can be taken in place while the data transfer. The data terminal 1310 is fed, for example, by the power supply 1320 rectifying the household 100 volt alternative current taking in from the power plug 1330. The data terminal 1310 is fed by the direct current coming from the power supply 1320 and it is also possible for the hand held remote receiver unit 1310 to be fed by the direct current.

The data terminal 1310 is connected to the computer unit for data acquisition 1340 through the interface 1230. After meter reading work has be done, the data transfer can be done simply by for the hand held type remote receiver unit of the passive meter reading system 1100 to insert into the inlet of the data terminal 1310. The recharging of the battery takes place at the same time to the data transfer.

This invention is the passive meter reading system and it permits to conserve the electrical power as maximum as possible by shutting off the power of unnecessary circuit that does not deal with the function of purpose. This is very effective to elongate the life of the battery that is located where frequent replacement of battery is not efficient. In other words conservation of power has an advantage to prevent frequent replacement of battery. The system is program to turn on the power supply one by one when it became necessary after receiving 'the Command of Meter Reading.' It has an advantage to conserve more power than all the power supply is turned on at once. The system of this invention also permits current on-site reading the utility meter in addition to perform the passive meter reading in distance.

What is claimed is:

1. A meter reading system for reading a meter comprising: a clock for counting elapsed time and days and outputting first and second output signals for respective first and second predetermined times during a month; a first power supply activated by the first output signal of the clock; an image processing unit driven by the first power supply for acquiring an image of a display portion of the meter; a second power supply activated by the second output signal of the clock; and a radio communication unit driven by the second power supply to transmit the image acquired by the image-processing unit to another radio communication unit.

2. A meter reading system according to claim 1; wherein the first predetermined time and the second predetermined time are different.

3. A meter reading system according to claim 1; wherein the first power supply is turned on only while the first output signal is generated, and the second power supply is turned on only while the second output signal is generated.

4. A meter reading system according to claim 1; wherein the radio communication unit transmits the image acquired by the image-processing unit to the other radio communication unit along with user identification data identifying a user of the meter.

5. A meter reading system according to claim 1; wherein the meter is a utility meter located at a building, and the display portion of the meter comprises at least one of a needle pointer type display and a digital type display.

6. A meter reading system according to claim 1; further comprising a movable joint for pivotally mounting the image-processing unit to the display portion of the meter;

and a fixing mechanism for fixing the image-processing unit to the display portion to prevent relative movement therebetween.

7. A meter reading system according to claim 1; further comprising another power supply for continuously driving the clock.

8. A meter reading system according to claim 1; wherein the other radio communication unit is a portable radio communication unit.

9. A meter reading system according to claim 8; wherein the portable radio communication unit is connectable to a portable computer.

10. A meter reading system for reading a meter comprising: a clock for counting elapsed time and days and outputting first and second output signals for respective first and second predetermined times during a month; a first power supply activated by the first output signal of the clock; a data-acquiring unit driven by the first power supply for acquiring a meter reading value; a second power supply activated by the second output signal of the clock; and a radio communication unit driven by the second power supply to transmit the meter reading value acquired by the data-acquiring unit to another radio communication unit.

11. A meter reading system according to claim 10; wherein the first predetermined time and the second predetermined time are different.

12. A meter reading system according to claim 10; wherein the first power supply is turned on only while the first output signal is generated, and the second power supply is turned on only while the second output signal is generated.

13. A meter reading system according to claim 10; wherein the radio communication unit transmits the meter reading value acquired by the data-acquiring unit to the other radio communication unit along with user identification data identifying a user of the meter.

14. A meter reading system according to claim 10; wherein the meter is a utility meter located at a building, and the data-acquiring unit acquires an image of a display portion of the meter.

15. A meter reading system according to claim 10; further comprising another power supply for continuously driving the clock.

16. A meter reading system according to claim 10; wherein the other radio communication unit is a portable radio communication unit.

17. A meter reading system according to claim 16; wherein the portable radio communication unit is connectable to a portable computer.

* * * * *